Feb. 15, 1944. B. F. PARR 2,341,648
HEATING APPARATUS AND THE LIKE
Filed Sept. 6, 1941 2 Sheets-Sheet 1

WITNESSES:

INVENTOR
Bernard F. Parr
BY
ATTORNEY

Feb. 15, 1944.   B. F. PARR   2,341,648
HEATING APPARATUS AND THE LIKE
Filed Sept. 6, 1941   2 Sheets-Sheet 2

WITNESSES:

INVENTOR
Bernard F. Parr
BY
ATTORNEY

Patented Feb. 15, 1944

2,341,648

UNITED STATES PATENT OFFICE 2,341,648

HEATING APPARATUS AND THE LIKE

Bernard F. Parr, Mansfield, Ohio, assignor to Westinghouse Electric & Manufacturing Company, East Pittsburgh, Pa., a corporation of Pennsylvania Application September 6, 1941, Serial No. 409,780

7 Claims. (Cl. 240—5)

This invention relates to electric roasters or the like, and particularly to an improved construction therefor incorporating a lamp or other means for illuminating the interior of the roaster, and it has for an object to provide an improved device of the character set forth.

While the invention to be hereinafter described will find other uses as will be apparent to those skilled in the art, it is particularly adapted for use in an electric roaster having a cover provided with a window therein for inspecting the comestibles being cooked in the roaster. While it has been proposed in the past to provide such windows in roasters, it has often been difficult to see the comestibles in that insufficient light entered the roaster through such windows.

It is accordingly a further object of this invention to provide improved means for illuminating the interior of a roaster or the like.

These and other objects are effected by my invention as will be apparent from the following description and claims taken in accordance with the accompanying drawings, forming a part of this application, in which:

Figure 1:
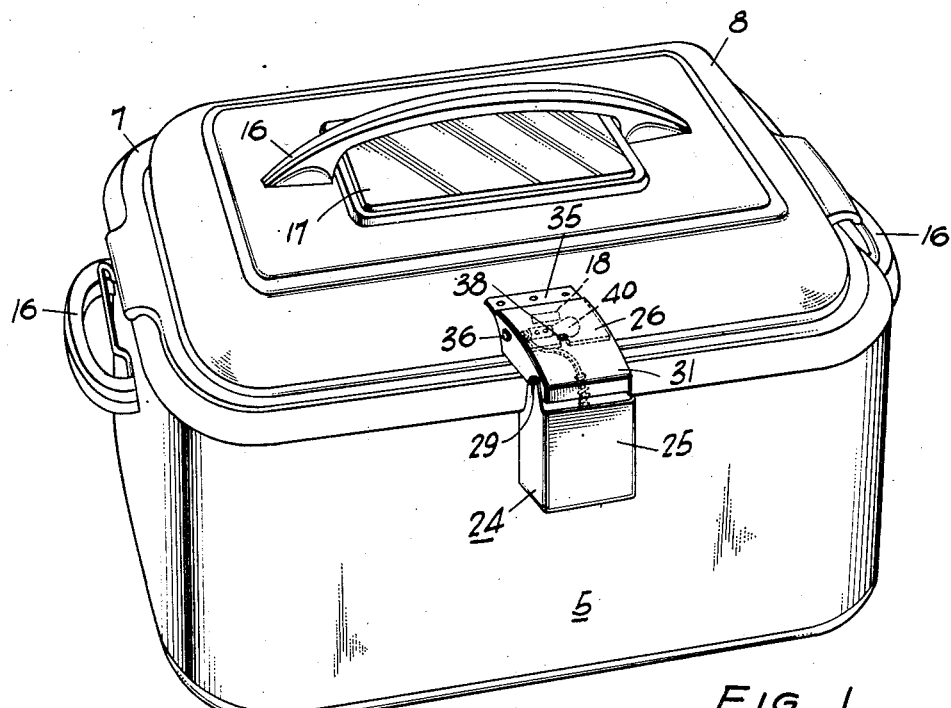
Fig. 1 is a perspective view of an electric roaster made in accordance with the present invention.
Figure 2:
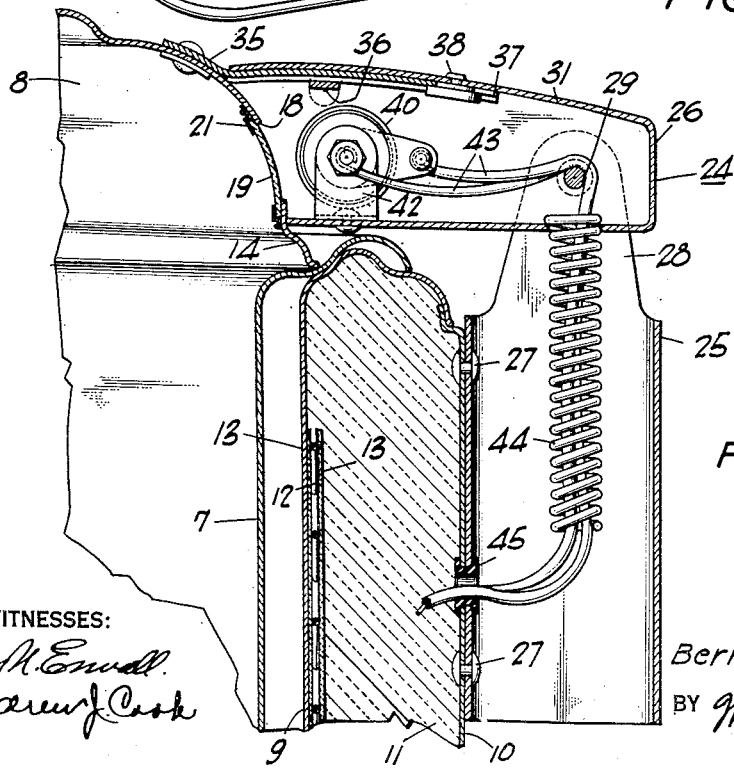
Fig. 2 is a vertical section through the hinge assembly of the roaster illustrated in Fig. 1.
Figure 3:
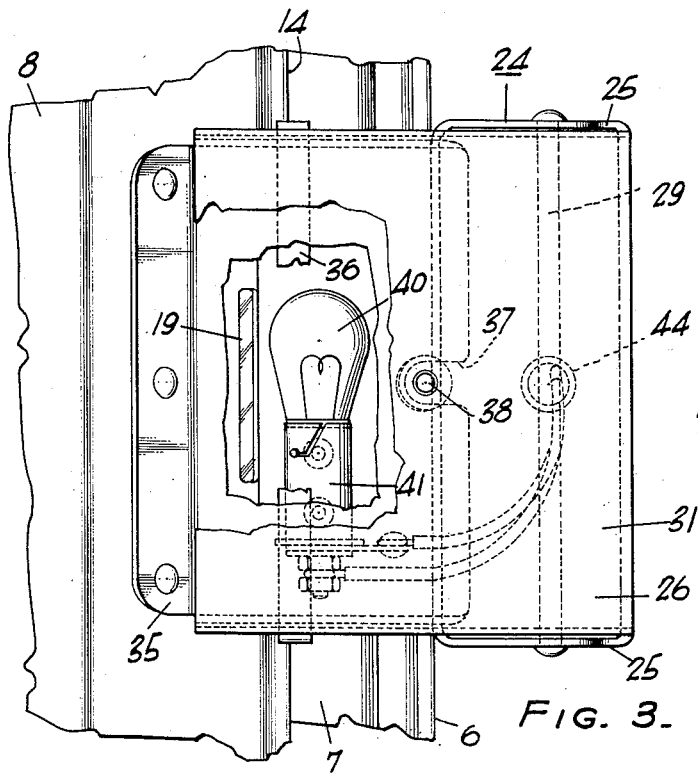
Fig. 3 is a fragmentary plan view of the roaster and hinge assembly illustrated in Fig. 1, portions being broken away to illustrate certain details of construction.

Referring to the drawings and particularly to Figs. 1 to 3 inclusive, there has been illustrated for the purpose of furnishing a clear understanding of the invention a roaster, generally indicated at 5. The roaster 5 comprises a body portion 6, having a removable liner or inset pan 7 in which the food or vessels containing the food may be placed, and a cover 8. The roaster body 6 may be of any desired construction and preferably includes spaced inner and outer walls 9 and 10, respectively. These walls provide a space which may be filled with suitable heat-insulating material 11.

The interior of the roaster, which receives the food to be cooked, is heated by means of a resistance wire 12 wrapped around and suitably secured to the outer surface of the inner wall 9, the wire 12 being disposed between two sheets of insulating material 13. It will be understood that the wire 12 is adapted to be connected to a suitable source of power and preferably in series with a thermostat or other temperature-controlling means (not shown) as is well known in the art. The specific construction of the body 6 and the inset pan 7 forms no part of the present invention and the construction described above is to be considered as illustrative only, since the invention may be used with other types of roasters and with other appliances.

The cover 8 may also be of conventional construction and preferably includes a rim 14 adapted to seat either in a groove provided along the upper edge of the inset pan 7 or in a groove provided in the upper edge of the roaster body. The cover 8 is provided with a handle 16 which overlies a look-in window 17.

The conventional cover 8 is modified by providing a small window or opening 18 adjacent the side thereof, which window may be closed by a transparent member 19 secured to the cover as by means of a flanged ring 21. As shown in Figs. 1 and 3, the window 18 is preferably provided in the center of one of the long edges of the cover when a single hinge 24 is used for attaching the cover to the roaster body. However, when two or more hinges are to be used, this window may be located in the region of either or both of such hinges so as to be concealed thereby.

The hinge 24 comprises a sleeve-like hinge member 25 adapted to be fixed to one wall of the roaster body and a complementary hinge member 26 adapted to be detachably secured to the cover, as will appear hereinafter. While it is proposed to detachably secure the cover 8 to the hinge 24, it is to be understood that if desired, the cover may be parmanantly attached to the hinge. The sleeve-like member 25 which, as shown in Figs. 1 and 3, may be substantially rectangular, is secured as by means of rivets 27 to the outer wall 10 of the roaster body. The walls of this sleeve-like portion normal to the roaster wall 10 extend above the main body thereof to form trunnions 28 which receive the hinge pin 29.

The complementary hinge member 26 may also be substantially rectangular, and is preferably closed at its outer end and provided with aligned apertures in the opposed side walls thereof adjacent the closed end for receiving the hinge pin 29.

In the particular form of the invention illustrated in Figs. 1 to 4 of the drawings, the roaster cover 8 has secured thereto a tongue 35 which, as shown in Fig. 2, extends substantially horizontally from the cover. This tongue extends over the window 18 and protects the same when the cover is detached from the roaster body 6. This tongue is adapted to be received between upper wall 31 of the hinge portion 26 and a transverse rod 36 extending between the side walls of this hinge portion. The rod 36 may be secured to the hinge portion 26 in any desired manner as by bending the ends thereof against the outer surface of the portion 26 as shown in Figs. 1 and 2.

The free end of the tongue 35 is provided with an open-ended slot or notch 37, see Figs. 2 and 3, which receives a headed rivet 38 carried by the mentioned upper wall 31. The rod 36 and cooperating rivet 38 and notch 37 firmly attach the cover 8 to the hinge 24 while permitting the cover to be readily detached therefrom when desired. As will be apparent from inspection of Fig. 2, the tongue may be slightly bowed in transverse section, or, if desired, provided with flanges or ribs to increase its rigidity.

With the cover assembled on the hinge 24, the tongue 35 and hinge portion 26 provide a substantially light-tight enclosure for a lamp 40. The lamp 40 is preferably mounted in a socket 41 of any desired construction, which socket is secured, as by means of a bracket 42, to the bottom wall of the hinge member 26. This lamp is provided with suitable conductors 43 which, as shown in Fig. 2, may be trained over the hinge pin 29 to minimize kinking thereof as the cover is raised and lowered about this hinge pin. To further protect these conductors, they are passed through a spiral spring 44 supported in an aperture in the hinge portion 26 and depending into the sleeve-like member 25. As shown in Fig. 2, the conductors may extend through an insulating bushing or grommet 45, provided in the outer wall 10, into the interior of the roaster body to be connected to a suitable source of power. The lamp circuit is preferably controlled by means of a switch (not shown) which may be conveniently mounted on the front of the roaster.

Figure 4:
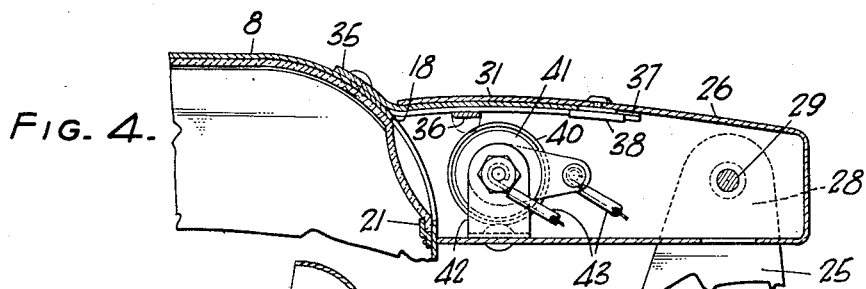
Fig. 4 is a vertical section similar to Fig. 2 illustrating a slightly modified form of the invention.

In Fig. 4 there has been shown a slightly modified form of the invention in which the transparent material covering the look-in window 17 is extended over the window 18 provided adjacent the illuminating lamp 40. The remaining structure of this form of the invention may be the same as that described above. As shown in Fig. 4 the portion of the transparent material covering the window 18 may be shaped to provide a lens for either concentrating or diffusing the light from the lamp 40.

If desired, the inner surface of the hinge portion 26, which houses the lamp 40, and the lower surface of the tongue 35 may be bright or reflecting surfaces to reflect light from the lamp into the interior of the roaster body.

Figure 5:
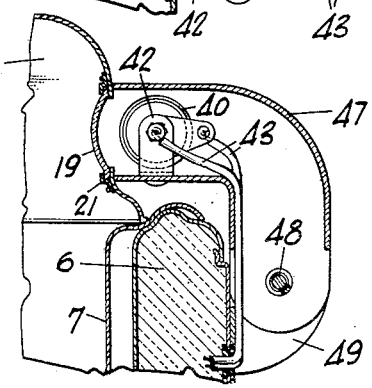
Fig. 5 is a vertical section similar to Figs. 2 and 4 illustrating a further modification of the invention.

A further embodiment of the invention is illustrated in Fig. 5. In this form of the invention the roaster body 6, inset pan 7 and cover 8 may be the same as those described above. It will be understood that the cover 8 will be provided with windows like those shown in Fig. 1 or Fig. 4. However, in this form of the invention, the cover 8 is not hinged to the roaster body but merely rests on the upper flange of the inset pan 7.

The interior of the roaster illustrated in Fig. 5 is illuminated by means of a lamp 40 carried by a bracket 42 supported within a tubular lamp housing 47. This housing, which may be elbow-shaped, is preferably hinged to the roaster body 6 to facilitate removal of the inset pan 7 from the roaster for cleaning. In the particular embodiment shown, the housing 47 is hinged at 48 to a bracket 49 secured to the roaster body 6. The hinge 48 may be of the spring type so that the elbow-shaped housing 47 is resiliently held in the position shown in Fig. 5, but may be swung back so that the inset pan 7 may be removed from the roaster body.

As shown in Fig. 5, the housing 47 is arranged so that its upper open end, which carries the bulb 40, is located adjacent the light window 19 thereby directing light from the lamp into the roaster. As in the case of the roasters illustrated in Figs. 1 and 4, the conductors 43 for the lamp 40 of the roaster shown in Fig. 5 may extend through the lamp housing 47 and into the roaster body through a bushing 45 for connection to a source of electricity.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A roaster or the like comprising a body portion, a cover for said body portion, means for hinging said cover to said body portion, a portion of said cover being transparent to permit inspection of the interior of said body portion, illuminating means carried by said hinging means independently of said cover for illuminating the interior of said body portion, and means in said cover for directing light from said illuminating means into said body portion.

2. A roaster or the like comprising a body portion, a cover for said body portion, said cover having a window therein, hinge means connecting said cover to said body portion, said hinge means including an enclosing portion, a lamp mounted within said enclosing portion independently of said cover and adapted to illuminate the interior of said body portion, and means in said cover for directing light from said lamp into said body portion.

3. A roaster or the like comprising a body portion, a cover for said body portion, said cover having a window therein, a hinge member attached to said body portion, a complementary hinge member pivoted on said first-mentioned hinge member, means for securing said cover to said complementary hinge member whereby said cover is hinged to said body portion, said complementary hinge member forming an enclosure for a lamp, a lamp supported within said enclosure, and means in said cover for directing light from said lamp into said body portion.

4. A roaster or the like comprising a body portion, a cover for said body portion, said cover having a window therein, a hollow hinge member attached to said body portion, a complementary hollow hinge member pivotally attached to said first-mentioned hinge member, means for attaching said cover to said complementary hinge member, a lamp supported within said complementary hinge member, said cover having an opening therein for directing light from said lamp into the interior of said body portion, and a conductor for said lamp extending through said hollow hinge members and concealed thereby.

5. A roaster or the like comprising a body portion, a cover for said body portion, said cover having a window therein, means for hinging said cover to said body portion, said means including a hinge member attached to said body portion and a hollow hinge member pivoted to said first-mentioned hinge member, means for detachably securing said cover to said hollow hinge member, a lamp supported within said hollow hinge member in a position to throw light through said window into the interior of said body portion, and a second window in said cover to permit inspection of the comestibles in said roaster.

6. A roaster or the like comprising a body portion, a cover for said body portion, said cover having a window therein, a hinge member attached to said body portion, a complementary hinge member pivoted to said first-mentioned hinge member, means for detachably securing said cover to said complementary hinge member whereby said cover is hinged to said body portion, said complementary hinge member forming an enclosure for a lamp, a lamp supported within said enclosure, and means in said cover for directing light from said lamp into said body portion.

7. A roaster or the like comprising a body portion adapted to receive comestibles to be cooked therein, a cover for said body portion, said cover having a window therein to permit inspection of the comestibles in said body portion, a hinge member attached to said body portion, a complementary hinge member pivotally attached to said first-mentioned hinge member, a tongue carried by said cover, means for detachably securing said tongue to said complementary hinge member, said complementary hinge member including a hollow portion having an opening disposed adjacent said cover when said tongue is secured to said complementary hinge member, said cover having a window therein substantially aligned with said opening in said hollow portion, and a lamp supported within said hollow portion and adapted to direct light through said last-mentioned window into the interior of said roaster body.

BERNARD F. PARR.